(No Model.)
B. F. MOHR.
CLUTCH MECHANISM.
No. 298,608. Patented May 13, 1884.
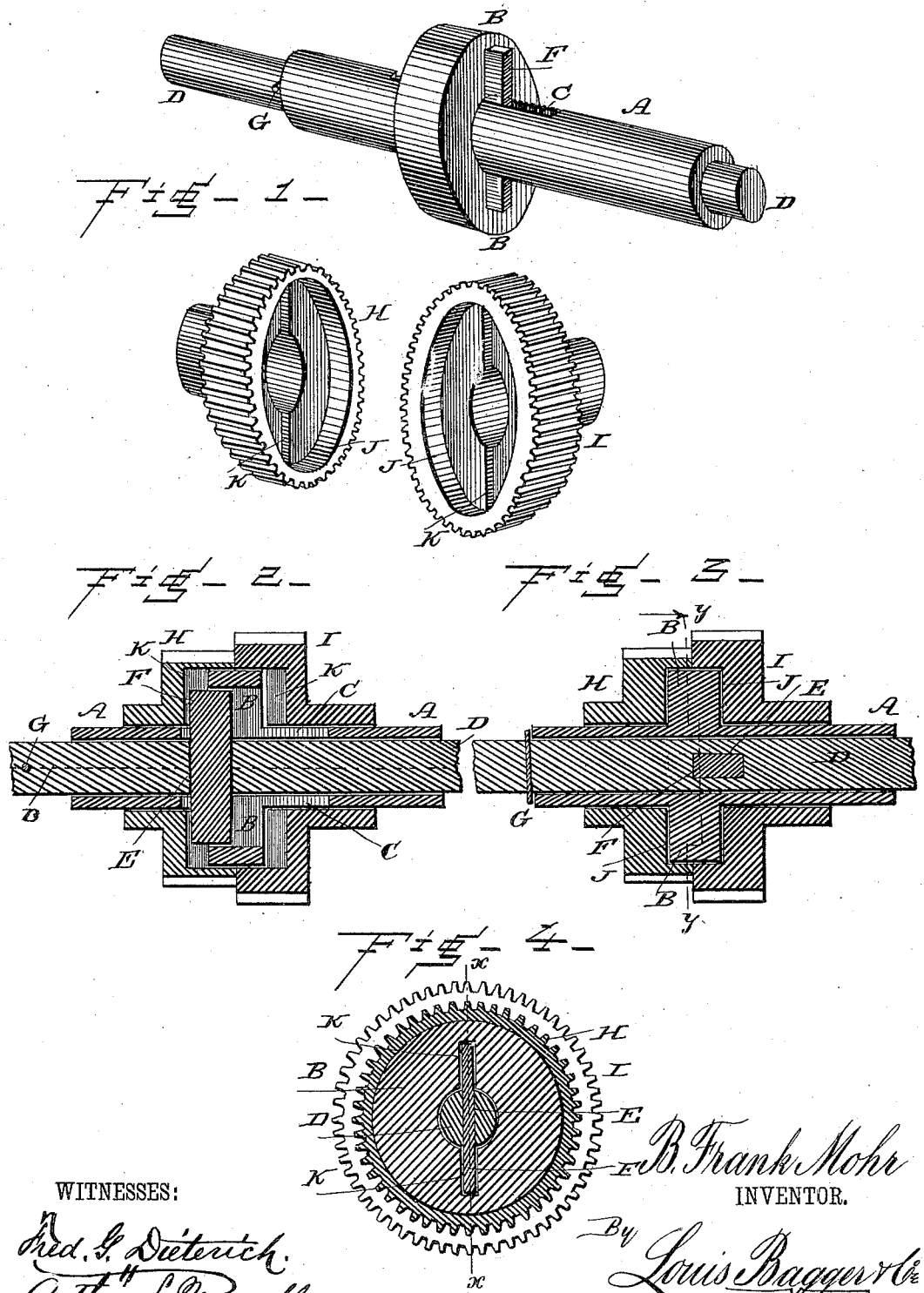
WITNESSES:
Fred. G. Dieterich.
Arthur L. Morsell.
B. Frank Mohr
INVENTOR.
By Louis Bagger & Co.
ATTORNEYS.

UNITED STATES PATENT OFFICE.

B. FRANK MOHR, OF MIFFLINBURG, PENNSYLVANIA.

CLUTCH MECHANISM.

SPECIFICATION forming part of Letters Patent No. 298,608, dated May 13, 1884.

Application filed April 5, 1884. (No model.)

*To all whom it may concern:*

Be it known that I, B. FRANK MOHR, a citizen of the United States, and a resident of Mifflinburg, in the county of Union and State of Pennsylvania, have invented certain new and useful Improvements in Clutch Mechanism; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the several parts of my improved clutch mechanism detached from one another. Fig. 2 is a longitudinal sectional view of the complete device with the parts arranged for engaging the smaller wheel or pinion. Fig. 3 is a longitudinal sectional view of the complete device through a plane at right angles to the view shown in Fig. 2, through line $x\ x$ in Fig. 4, showing the mechanism arranged for engaging the larger pinion and the shaft; and Fig. 4 is a cross-section of the device through line $y\ y$ in Fig. 3.

The same letters refer to the same parts in all the figures.

This invention relates to clutches for divers kinds of machinery; and it has for its object to produce a device whereby either one of two adjacent wheels or pinions may be connected rigidly with the shaft upon which they are mounted, or by which, when required, they may be both disconnected from the said shaft, which may thus be permitted to revolve without affecting the position of the wheels or pinions, or the parts of the machinery operated thereby.

To this end my invention consists in the improved construction and arrangement of parts, which will be hereinafter fully described, and particularly pointed out in the claims.

Referring to the drawings hereto annexed, A designates the shaft carrying my improved clutch mechanism. This is a tubular shaft, which is provided with a fixed circular disk, B. A slot, C, is formed longitudinally in the shaft A, and extending entirely through the disk B, as clearly illustrated in the drawings. This slot extends for a greater distance on one side of the said disk than on the other, for the purpose which will be presently stated.

D is a shaft or rod moving longitudinally in the tubular shaft A, and having a longitudinal slot, E, of a length equal to the width of the disk B upon shaft A. After the said rod has been placed in position in the tubular shaft, a key, F, is inserted into its slot E, said key being inserted through the longest portion of the slot C of shaft A, adjacent to the disk B of the latter. This key, it will be seen, is of a width equal to the width of the disk B, into which it may be drawn, so as to be entirely flush with the sides or faces of the said disk. A pin, G, is driven transversely through the shaft or rod D, so as to limit the movement of the latter to such an extent that the transverse key F may be only half exposed on either side of the disk in the diametrical slot or recess of which it may be wholly concealed without projecting on either side.

H and I are a pair of pinions, of unequal diameter, which are mounted loosely upon the tubular shaft A. It is obvious that band-wheels may, when desired, be substituted for the said pinions. The inner or adjoining faces of these wheels or pinions are provided with recesses J, of sufficient depth to accommodate one-half of the width of the disk B, and in the bottoms of these recesses are formed diametrical grooves K, to receive such portion of the diametrical key F as may be caused to project beyond the sides of disk B, in which the key works.

From the foregoing description, taken in connection with the drawings, the operation of this invention will be readily understood. When the rod D is so adjusted as to place the key F entirely within its recess in disk B, the shaft will revolve without affecting the position of either of the wheels or pinions H and I. By moving the rod D in either direction, which may be done either by hand or by means of a suitably-arranged lever or other mechanism, the key F may be caused to enter the groove K in either one of the said wheels or pinions, which will thereby be caused to revolve with the shaft, thus imparting motion to other parts of the machinery of which this device forms a part.

The advantages of this invention are obvious. Its construction is simple, and the space occupied by the device does not exceed the actual width of the wheels or pinions to be operated or actuated by the clutch, thus rendering it available for many purposes where it has heretofore been necessary to employ more complicated and less efficient mechanism. Another point of advantage is the great strength of the clutch, both the key F and the recessed pinions H being at all times re-enforced by the disk B upon the tubular shaft A.

Instead of the cylindrical part or disk B, the tubular shaft A may be constructed with two radial wings or arms projecting in opposite directions, and slotted longitudinally in like manner as the disk, to receive the sliding clutch-key F.

Having thus described my invention, I claim and desire to secure by Letters Patent of the United States—

1. In a clutch, the combination of a tubular shaft having a longitudinal slot, a longitudinally-sliding rod having a transverse key moving with the rod in the said slot, and wheels or pinions mounted loosely upon the said tubular shaft, and having grooves or recesses in their inner sides adapted to receive and engage the said key, substantially as set forth.

2. In a clutch, the combination, with a tubular shaft having a fixed diametrically slotted disk or its equivalent, and a longitudinal slot extending entirely through the disk, of a longitudinally-movable rod having a transverse key moving in said slot, and of a width equal to the width of the disk, and a pair of wheels or pinions mounted loosely upon the said shaft, and having recesses in their inner adjoining sides, adapted to accommodate the disk, and provided with diametrical grooves in said recesses adapted to receive and engage the movable key, substantially as and for the purpose set forth.

3. The combination of the tubular shaft having the fixed disk or its equivalent, and a slot extending entirely through the same, said slot extending through the tubular shaft farther on one side of the fixed disk than on the other, a longitudinally movable rod inserted through the tubular shaft and having a transverse slot, a key fitted in the said slot and moving in the longitudinal slot of the tubular shaft, a pin passing transversely through the longitudinal rod to limit the movement of the same, and the wheels or pinions mounted loosely upon the tubular shaft and provided in their inner adjoining sides with circular recesses and diametrical grooves at the bottom of the latter, substantially as and for the purpose herein set forth.

In testimony that I claim the foregoing as my own I have hereunto affixed my signature in presence of two witnesses.

B. FRANK MOHR.

Witnesses:
 CHARLES M. ROHBACK,
 JAS. HAUS.